United States Patent
Moitrel et al.

(10) Patent No.: US 9,313,662 B2
(45) Date of Patent: Apr. 12, 2016

(54) METHOD OF PROTECTING A MOBILE-TELEPHONE-TYPE TELECOMMUNICATION TERMINAL

(75) Inventors: Pascal Moitrel, Aubagne (FR); Pascal Guterman, Roquevaire (FR); Philippe Proust, Marseilles (FR); Laurent Sustek, Auriol (FR); Mireille Pauliac, Aubagne (FR); Cedric Cardonnel, Carnoux en Provence (FR)

(73) Assignee: GEMALTO SA, Meudon (FR)

(*) Notice: Subject to any disclaimer, the term of this patent is extended or adjusted under 35 U.S.C. 154(b) by 1775 days.

(21) Appl. No.: 10/549,183

(22) PCT Filed: Mar. 19, 2004

(86) PCT No.: PCT/EP2004/050333
§ 371 (c)(1),
(2), (4) Date: Jul. 5, 2006

(87) PCT Pub. No.: WO2004/084525
PCT Pub. Date: Sep. 30, 2004

(65) Prior Publication Data
US 2008/0117889 A1   May 22, 2008

(30) Foreign Application Priority Data

Mar. 21, 2003   (FR) .................................. 03 03451

(51) Int. Cl.
*H04J 3/00* (2006.01)
*H04W 12/12* (2009.01)
*H04W 88/02* (2009.01)

(52) U.S. Cl.
CPC .............. *H04W 12/12* (2013.01); *H04W 88/02* (2013.01)

(58) Field of Classification Search
CPC .............................. H04W 12/12; H04W 88/02
USPC ................................................ 713/193; 726/2
See application file for complete search history.

(56) References Cited

U.S. PATENT DOCUMENTS

| | | | | |
|---|---|---|---|---|
| 5,392,351 A | * | 2/1995 | Hasebe et al. | 705/51 |
| 5,682,027 A | * | 10/1997 | Bertina et al. | 235/380 |
| 5,857,021 A | * | 1/1999 | Kataoka et al. | 705/54 |
| 6,138,005 A | | 10/2000 | Park | |
| 6,715,078 B1 | * | 3/2004 | Chasko et al. | 713/193 |

(Continued)

FOREIGN PATENT DOCUMENTS

| | | |
|---|---|---|
| EP | 1 061 755 A1 | 12/2000 |
| FR | 2 807 177 | 10/2001 |

(Continued)

*Primary Examiner* — Sarah Su
(74) *Attorney, Agent, or Firm* — Buchanan Ingersoll & Rooney PC

(57) ABSTRACT

A method of protecting a telecommunication terminal having a chip-card-type personal component which is required for telecommunication network access. The terminal includes a processing unit, at least one operating memory element containing the information necessary to the operation of the terminal, i.e. a terminal operating program, and the data necessary to the program. The method involves: a) encrypting the contents of the operating memory element of the telecommunication terminal using a pre-determined key K which is necessary for decryption; and b) allowing the terminal to commence decryption once the terminal has been started with a start-up program that is saved in a secure memory element and once the key for decryption has been calculated by same.

11 Claims, 1 Drawing Sheet

(56) References Cited

U.S. PATENT DOCUMENTS

| | | | |
|---|---|---|---|
| 6,775,778 B1* | 8/2004 | Laczko et al. | 713/194 |
| 7,082,615 B1* | 7/2006 | Ellison et al. | 726/26 |
| 7,461,249 B1* | 12/2008 | Pearson et al. | 713/156 |
| 7,788,487 B2* | 8/2010 | Ito et al. | 713/164 |
| 2002/0147918 A1 | 10/2002 | Osthoff et al. | |
| 2002/0161997 A1* | 10/2002 | Yamasaki et al. | 713/150 |
| 2003/0018579 A1* | 1/2003 | Litster et al. | 705/40 |
| 2003/0056107 A1 | 3/2003 | Cammack et al. | |
| 2004/0250077 A1* | 12/2004 | Jang et al. | 713/175 |
| 2005/0262537 A1* | 11/2005 | Baran et al. | 725/88 |
| 2006/0129848 A1* | 6/2006 | Paksoy et al. | 713/193 |
| 2007/0095927 A1* | 5/2007 | Pesonen | 235/492 |
| 2007/0282757 A1* | 12/2007 | Pandya et al. | 705/76 |
| 2008/0282084 A1* | 11/2008 | Hatakeyama | 713/155 |
| 2009/0150991 A1* | 6/2009 | Hoey et al. | 726/18 |
| 2010/0082960 A1* | 4/2010 | Grobman et al. | 713/2 |

FOREIGN PATENT DOCUMENTS

| | | |
|---|---|---|
| JP | 63-266533 | 11/1988 |
| JP | 2003-120730 | 4/2003 |

* cited by examiner

METHOD OF PROTECTING A MOBILE-TELEPHONE-TYPE TELECOMMUNICATION TERMINAL

BACKGROUND OF THE INVENTION

The present invention pertains to a process for protecting a telecommunication terminal. It also refers to any equipment incorporating a communications terminal protected by implementing this process.

The term "telecommunication terminal" implies any portable cellular phone or PDA that has a personal component-hardware or software, which includes data that enables a user to access a service. In the case of GSM, it pertains to an integrated circuit card or chip card, usually known as SIM (Subscriber Identity Module) or (U) SIM, issued when a subscriber buys a mobile phone.

The mobile device of a subscriber is equipped with a functional unit called "chip card reader" which enables communication with the SIM card. This reader includes a user interface to enable exchanges between the user and the card through the device.

Besides, the functional unit of the device includes a processing unit connected to the media which stores information for its functioning: programs and data. The device also has media for communicating with the telecommunication network(s).

We are now facing many problems due to the increase in the market size of mobile telephony.

viz.

1) Devices made with old technology contain memory that can be freely accessed by read and write functions. Hence the user's sensitive data and the operator's knowhow are easily accessible in case of a theft.

2) Devices made with old technology can be made compatible with other operator networks by changing its personal component, hardware/software.

3) A cellular phone service provider often provides a device at a low price to a new subscriber. In return the service provider wants the subscriber to have restricted access to certain services during a given period.

Today, there exists a solution in the GSM field to solve these last two problems. This solution is called the lock mechanism or alternatively SIM Lock and was defined by the ETSI (European Telecommunications Standards Institute). It enables to curb the problems related to the theft of a mobile phone. The principle is to lock the phone for certain specific access in order to prevent a thief from using it without restraint in case of theft and to prevent the user from using it on networks of competitors.

The mechanism "SIMLock" has three different functions:
it locks a device to the network of a specific service provider;
it locks a device for specific services of a given service provider;
it locks a device onto a given SIM card.

The "SIMLock" of a device is performed by an indicator or "flag" within the device indicating that the device is in a locked state. When a locked phone is switched on, this indicator retrieves the IMSI (International Mobile Subscriber Identity) number of the card (card identification number) and verifies that it corresponds to the lock conditions.

A phone can be unlocked only by using a secret code which is calculated by a undisclosed algorithm possessed by the carrier, depending upon the IMEI (International Mobile Equipment Identity) code, which is the unique serial number of a phone stored in the RAM.

Devices with old state of the art technology present the following problems:
Confidential data is not protected and can be accessed by anyone;
The existing "SIMLock" is not effective for the following reasons:
As the secret unlocking algorithm is widely known to numerous sales outlets, it is very difficult to avoid leaks and thus it could become common knowledge. As the IMEI code of the phone is not located in the protected memory of the phone, it is also accessible: a thief can thus quite easily calculate the unlocking code of the phone;
The phone memory is not protected and a defrauder may succeed in directly modifying the lock "flag" without figuring-out the unlock code. He can also replace the IMEI number by another IMEI number whose associated unlock code he may know.

The problem that we are trying to solve is the problem regarding the protection of devices from fraudulent use, especially in case of theft.

The first subproblem concerns the protection of data.

The second subproblem consists in increasing the security provided by the locking mechanism of earlier technology, in order to limit fraudulent use.

SUMMARY OF THE INVENTION

The present invention pertains to a process for protecting a telecommunication terminal with a personal software component like a chip card to access the communications network or a device with a processing unit, at least one operating memory containing information needed for the functioning of the device viz. an operating programme for the device and the data needed for this programme, mainly characterised by its functions:

a) To decode the content of the operating memory of the telecommunication terminal from a pre-determined K key necessary for decoding, b) To enable decoding by the device:
Once the device has been switched on with the help of a start-up programme registered in a secure memory (21) and,
Once the key used for decoding with this programme has been calculated.

In accordance with another feature, the decoding is done in flight by an arithmetic unit, which decodes the information from the operating memory in blocks and stores the decoded blocks in a register, the processing unit using these decoded blocks to work.

In accordance with another feature, the device may be locked with the help of a lock stored in the operating memory.

Advantageously, the decoding key is the function of a characteristic feature of the device as the number of a hardware component stored in the OTP (One Time Programmable) memory of the given component.

In accordance with another feature, the decoding key is in particular the function of characteristic information of the chip card as this information is stored in the memory of the chip card in such a way that it cannot be modified.

Another aim of the present invention pertains to a telecommunication terminal including a personal component software like a chip card needed to access the communications network; initial processing unit, an operating memory containing information needed for the functioning of the device viz. an operating programme of the device and data needed for this programme mainly characterised by the content as the content of the operating memory is coded, so that the device includes another programme memory containing a start programme to launch the calculation of the K key needed for decoding.

In accordance with another feature, the device includes a second run unit meant for decoding the functioning memory on the fly. It also has a register which stores the information decoded on the fly in the form of blocks as the run unit works with these decoded blocks.

In accordance with another feature, the device includes a hardware component, which cannot be modified and contains a characteristic data of the device; this data is used in the calculation of the K key.

BRIEF DESCRIPTION OF THE DRAWINGS

Other distinctive features and advantages of the invention will be explained clearly in the following description, given by way of illustration, though not limited to it, and with respect to the attached diagrams wherein.

DETAILED DESCRIPTION

Figure 1:
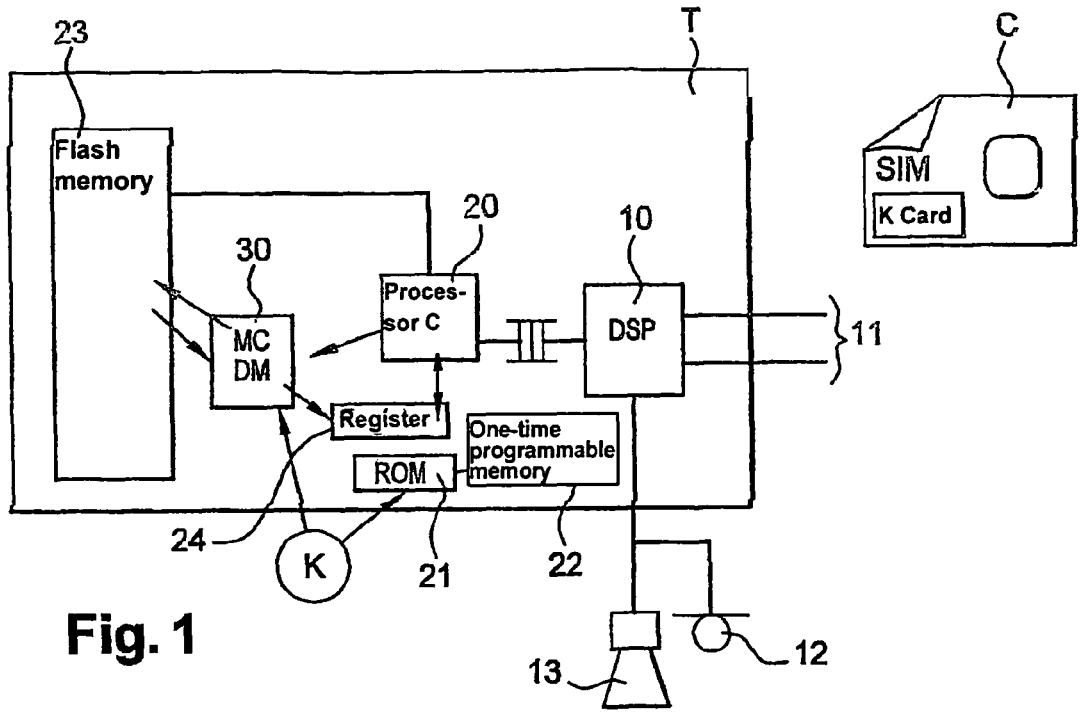
FIG. 1, represents the diagram of a telecommunication terminal like a mobile phone, associated with a chip card, suitable for the implementation of the process according to an initial embodiment.
Figure 2:
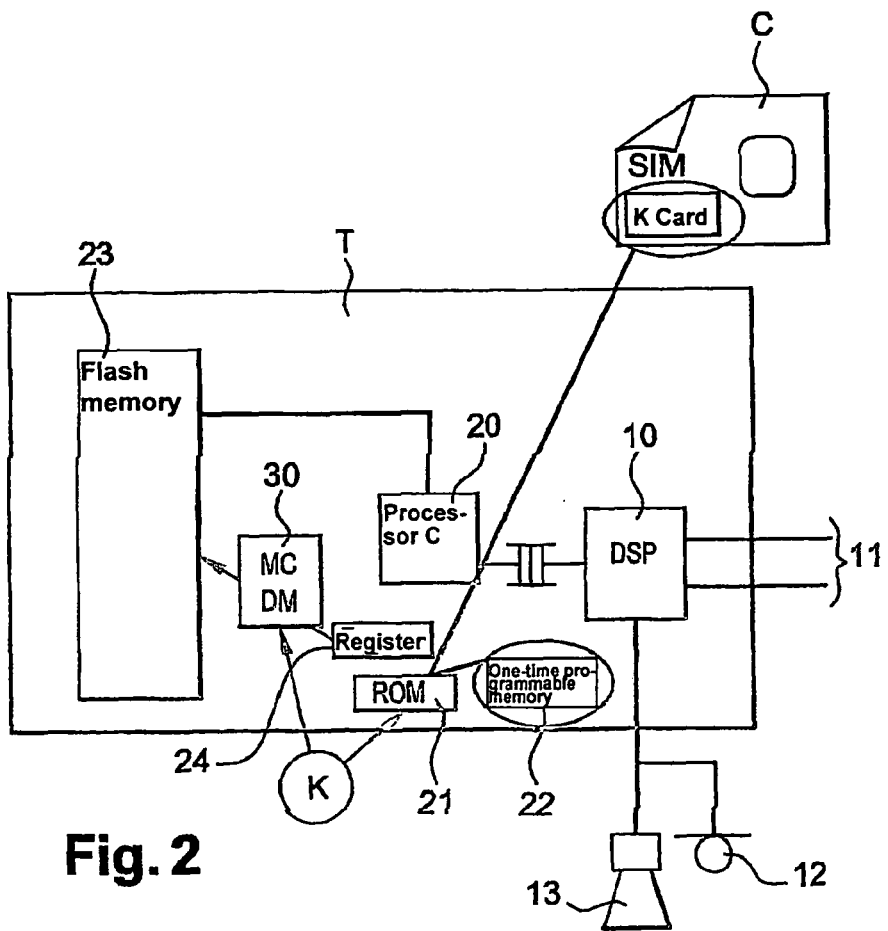
FIG. 2, represents the drawing of a telecommunication terminal corresponding to a second operating mode.

The equipment shown in FIGS. 1 and 2 corresponds to a telecommunication terminal T associated with a SIM card type of chip card C.

The terminal in the practical example given below is a mobile phone T. But the invention is applicable to any device performing a mobile phone function; it can also pertain to a PDA.

The associated chip card C, includes types of memory containing application programmes as per prior art and at least one distinguishing piece of information such as the IMSI number.

The phone T includes as per prior art:
A specialised processor 10 enabling to issue and receive phone calls as this processor is linked to antenna 11, a microphone 12 and a loud-speaker 13 of the phone,
An initial processing unit 20 suitable to carry out exchanges with chip card C,
One memory 23 which can be programmed and electrically rewritten (flash memory).

The chip card C associated with a phone is meant to be inserted into the phone. The processing unit 20 can communicate with the card C to verify the user identification code (PIN code) and to control the different resident application programmes with the card.

In accordance with the invention, the device also includes:
A second processing unit 30 meant for coding/decoding. This unit includes a decoding algorithm which includes an arithmetic algorithm and a key calculation.
One register 24;
One read-only programme memory 21 like ROM
One secure memory 22 associated with component software (hardware: processing unit or memory). This memory 22 is e.g. a one-time programmable memory (OTP memory of the component), The programmes needed for the functioning of the device and the distinguishing data of the phone, are recorded in memory 23 and are decoded before saving. This memory is called the operating memory of the device. It includes the source programme for operating, the operating system, the SIMLOCK indicator lock, the IMEI code, the verification code for unlocking the SIMLOCK lock and the user directory.

The information saved in this memory 23 is not accessible without the decoding programme and the key K which was used for this coding.

The functioning of the device is subject to the calculation of the key K. In addition, it is impossible to access the information stored in the device memory without knowing this key K; this information is thus protected against all tampering.

Only the device itself can decode the content from the memory provided that it is suitable to calculate the key meant for coding.

An initial level of protection corresponding to an initial embodiment shown by the diagram in FIG. 1 consists in choosing a key K resulting from information that cannot be modified and which characterises the device in a unique way. Preferably a serial number NS of a hardware component (processor, memory) stored in the programmable memory 22 associated only once with the component, it taken as characteristic data to generate key K.

This initial level of protection enables to protect the content of memory 23 from being read.

The information contained in memory 22 of the phone remains undisclosed and accurate.

In the given example, after calculating the key K, the device can function with any SIM card, unless of course the SIMLOCK lock is not present in memory 23. However, its data can never be easily accessed, thus solving the first sub-problem and bringing about an initial degree of security.

A higher level of security, which corresponds to the second embodiment shown by FIG. 2, is proposed in the following example. This mode can even refrain from providing the SIMLOCK lock.

In this case, we choose key K, which is a function not only of a non modifiable information characterising the device in a unique manner, but also of a secret Kcard key assigned to the SIM card when the card is manufactured in order to ensure its security, e.g. the IMSI number can be used.

Thus, the phone will be locked without knowing this key K associated with the resident SIM card. The phone cannot be unlocked if the SIM card has been changed.

In order to enable a mobile phone to function, a BOOT start programme is recorded in the read-only memory 21. The processing unit 20 completed by a processor is launched from this programme as soon as the device is switched on and the user has entered his secret code.

The start programme enables to initiate the execution of the calculation of the K key. When the key is calculated, it is used for the decoding operation performed by the exclusive calculation unit 30.

The decoding is done in flight. Unit 30 decodes the information of memory 23 by blocks on request from processor 20. Each block may, e.g. be made up of a logical word. The processor provisionally stores the decoded blocks outside memory 23, more precisely in register 24 in order to operate them.

The content of memory 23 always remains coded. The processor uses the content of register 24 in order to function.

If the decoding key is derived from two components viz. the Kcard key and the serial number NS stored in memory 22, the phone will not be able to function with another SIM card. However, the user may be able to voluntarily block his phone. In this case, the data from memory 23 is decoded then recoded with a new key. This operation is indeed reversible.

It should be noted that the invention applies to all communication devices with a personal component software like a SIM card of a mobile phone.

The invention claimed is:

1. A process for protecting a mobile telecommunication device, the mobile device having a personal software component used to access a communications network, a processing unit, a calculation unit, a secure memory, read-only memory, and at least an operating memory that stores an operating programme and data needed for said programme, said process comprising the following steps:
   a) coding, in the processing unit, the operating programme and data stored in the operating memory of the mobile telecommunication device with a pre-determined key K that is generated using unique information associated with the mobile device stored in the secure memory and unique information associated with and stored in the personal software component, and
   b) enabling a decoding of the operating programme and data with the predetermined key K when:
      the mobile device is started using a start programme stored in secure the read-only memory and,
      the predetermined key K is calculated by the device by accessing the unique information associated with the mobile device stored in the secure memory and accessing the unique information associated with and stored in the personal software component,
   wherein the decoding is performed by the calculation unit on request from the processing unit, the calculation unit which decodes the operating programme and data in blocks and stores the decoded blocks in a register, wherein the processing unit executes functions based on the decoded blocks, and
   wherein said personal software component is a chip card.

2. The process, in accordance with claim 1, wherein the device can be locked based on a lock stored in the operating memory.

3. The process, in accordance with claim 2, wherein the predetermined key K is a decoding key that depends on distinguishing information of the device, the distinguishing information includes a number of a hardware component stored in the secure memory of said hardware component.

4. The process for protecting a mobile telecommunication device in accordance with claim 2, wherein the predetermined key K is a decoding key that is dependent on a distinguishing piece of information that is saved in the secure memory of said component so that the decoding key cannot be modified.

5. The process in accordance with claim 1, wherein the predetermined key is also a decoding key that depends on distinguishing information of the device including a number of a hardware component stored in one-time programmable memory of said mobile device.

6. The process in accordance with claim 1, wherein the pre-determined decoding key that is dependent on a distinguishing piece of information that is saved in the memory of said mobile device.

7. The process, in accordance with claim 1, wherein the device can be locked based on a lock stored in the operating memory.

8. The process, in accordance with claim 1, wherein the predetermined key K is a decoding key that depends on distinguishing information of the device, the distinguishing information includes a number of a hardware component stored in the secure memory of said hardware component.

9. The process in accordance with claim 1, wherein the predetermined key K is a decoding key that is dependent on a distinguishing piece of information that is saved in the secure memory of said component so that the decoding key cannot be modified.

10. A telecommunication terminal comprising:
    a personal software component encoded with software used to access a communications network;
    an operating memory that stores an operating programme of the terminal and data used by the operating programme,
    an initial processing unit that encodes the operating programme of the terminal and data with a key K that is generated using distinguishing data associated with the terminal and distinguishing data of the personal software component;
    a second processing unit that dynamically decodes the operating memory and a register that dynamically stores decoded information in blocks, wherein the initial processing unit uses these decoded blocks to function; and
    a calculation unit that calculates the key K based on the distinguishing data of the terminal and the distinguishing data of the personal software component and decodes the operating programme and data stored in the operating memory using the key K; and
    a programme memory that stores a start programme which enables a calculation of the key K that is used to decode the operating programme and data,
    wherein the initial processing unit is connected to send a decoding request to the calculation unit, and
    wherein said personal software component is a chip card.

11. The telecommunication terminal according to claim 10, further including a hardware component that cannot be modified and that contains distinguishing data of the terminal that is used to calculate the key K.

* * * * *